(12) United States Patent
Jeong

(10) Patent No.: US 11,687,776 B2
(45) Date of Patent: Jun. 27, 2023

(54) METHOD FOR CONTROLLING COOK BASED ON ARTIFICIAL INTELLIGENT AND INTELLIGENT DEVICE

(71) Applicant: LG ELECTRONICS INC., Seoul (KR)

(72) Inventor: Haekwang Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 806 days.

(21) Appl. No.: 16/579,727

(22) Filed: Sep. 23, 2019

(65) Prior Publication Data

US 2020/0019861 A1 Jan. 16, 2020

(30) Foreign Application Priority Data

Aug. 26, 2019 (KR) .................. 10-2019-0104209

(51) Int. Cl.
*G06N 3/08* (2023.01)
*G06F 16/951* (2019.01)
*G06F 18/214* (2023.01)
*G06V 20/68* (2022.01)

(52) U.S. Cl.
CPC ............ *G06N 3/08* (2013.01); *G06F 16/951* (2019.01); *G06F 18/214* (2023.01); *G06V 20/68* (2022.01)

(58) Field of Classification Search
None
See application file for complete search history.

(56) References Cited

U.S. PATENT DOCUMENTS

| 8,411,931 B2* | 4/2013 | Zhou | H04N 13/139 |
| | | | 382/154 |
| 2015/0170001 A1* | 6/2015 | Rabinovich | G06V 30/194 |
| | | | 382/110 |
| 2016/0327281 A1* | 11/2016 | Bhogal | H05B 1/0263 |
| 2019/0053332 A1* | 2/2019 | Cheng | H05B 6/6435 |
| 2019/0242584 A1* | 8/2019 | Ebert | F24C 7/085 |
| 2021/0228022 A1* | 7/2021 | Liu | F24C 7/081 |
| 2022/0167788 A1* | 6/2022 | Oh | A47J 36/321 |

* cited by examiner

*Primary Examiner* — Chris Parry
*Assistant Examiner* — Abderrahmen Chouat
(74) *Attorney, Agent, or Firm* — Lee, Hong, Degerman, Kang & Waimey PC

(57) ABSTRACT

A method for controlling cooking based on artificial intelligence and an artificial intelligence device are disclosed. In the method for controlling cooking based on artificial intelligence, it is possible to continuously monitor how food ingredients are progressing by generating reference information including image information of completed dishes using food ingredient image information acquired through a monitoring unit provided in a kitchen appliance (for example, oven) and determining the cooked state of the food ingredients based on the reference information. An artificial intelligence device according to the present disclosure may be linked with an artificial intelligence module, a drone (unmanned aerial vehicle (UAV)), a robot, an augmented reality (AR) device, a virtual reality (VR) device, devices related to 5G services, and the like.

15 Claims, 19 Drawing Sheets

[FIG. 1]
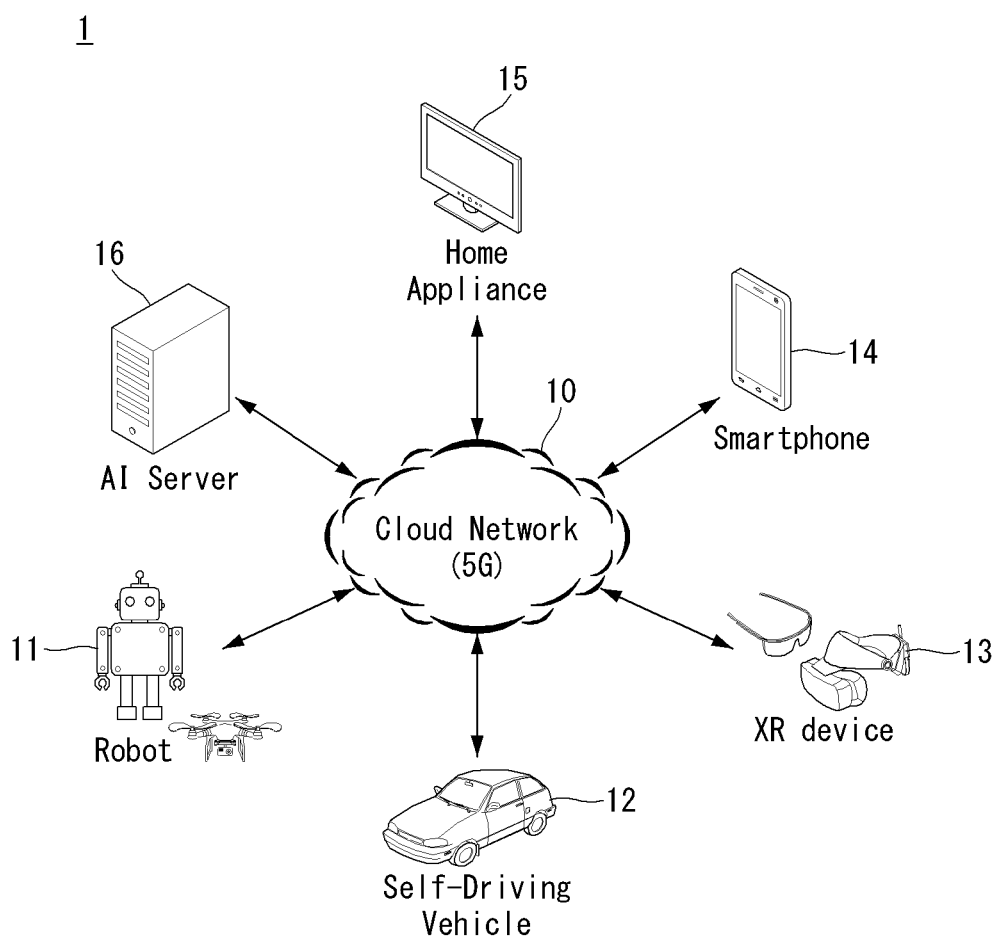

[FIG. 2]
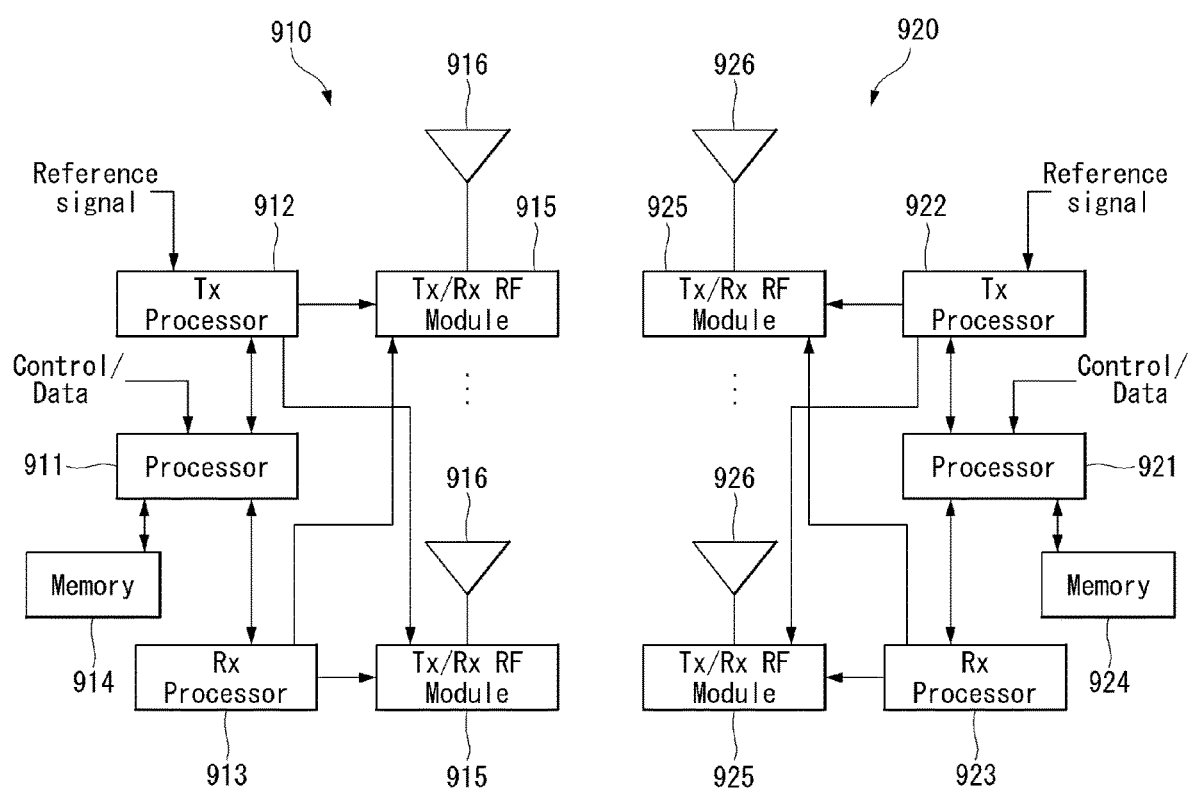

[FIG. 3]
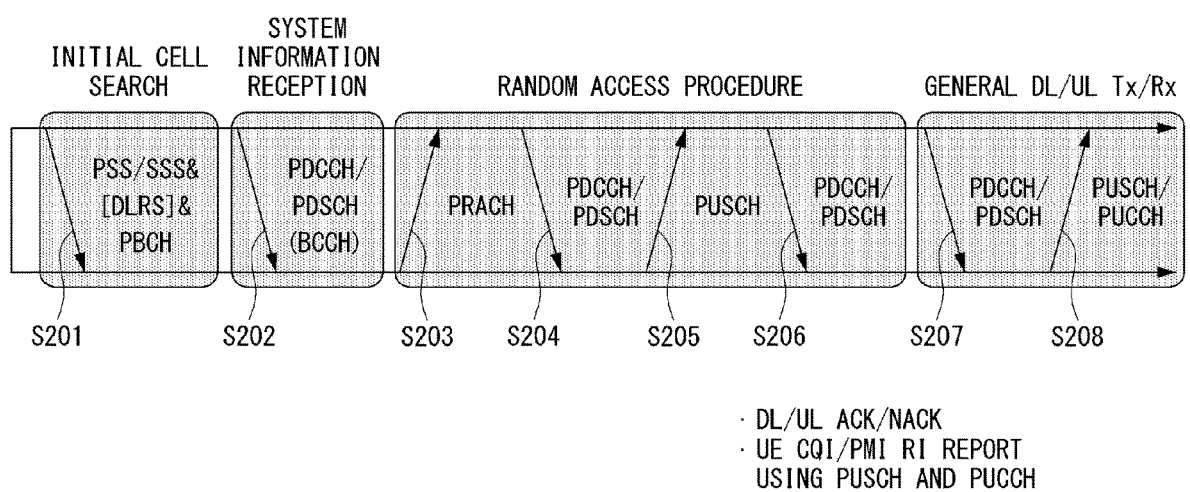

[FIG. 4]
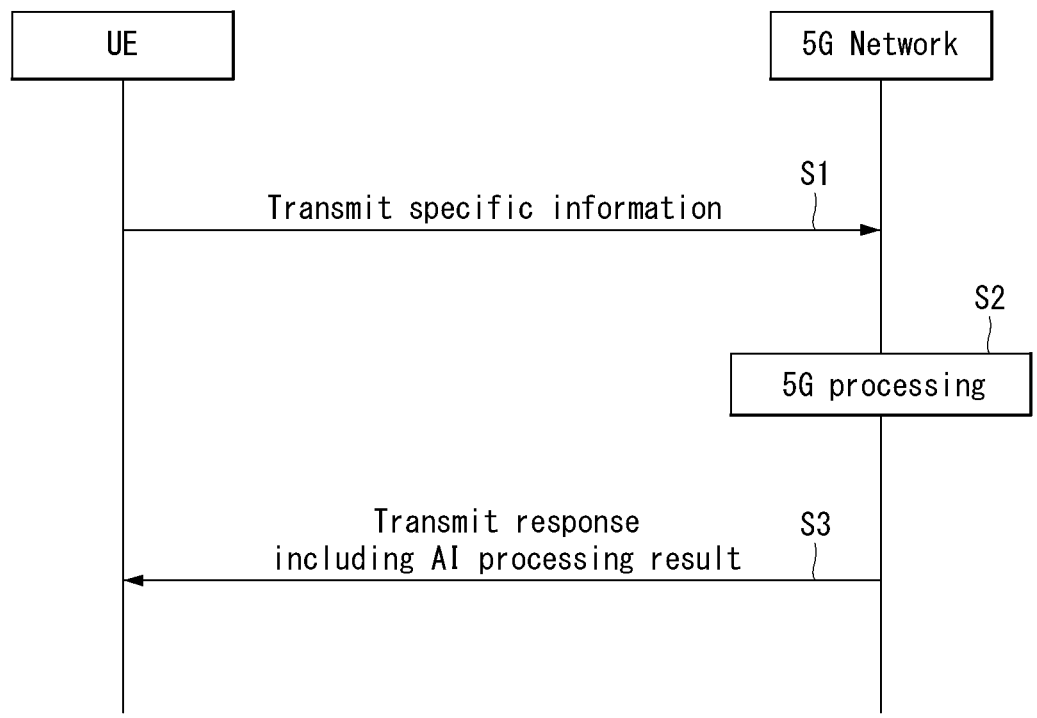

[FIG. 5]
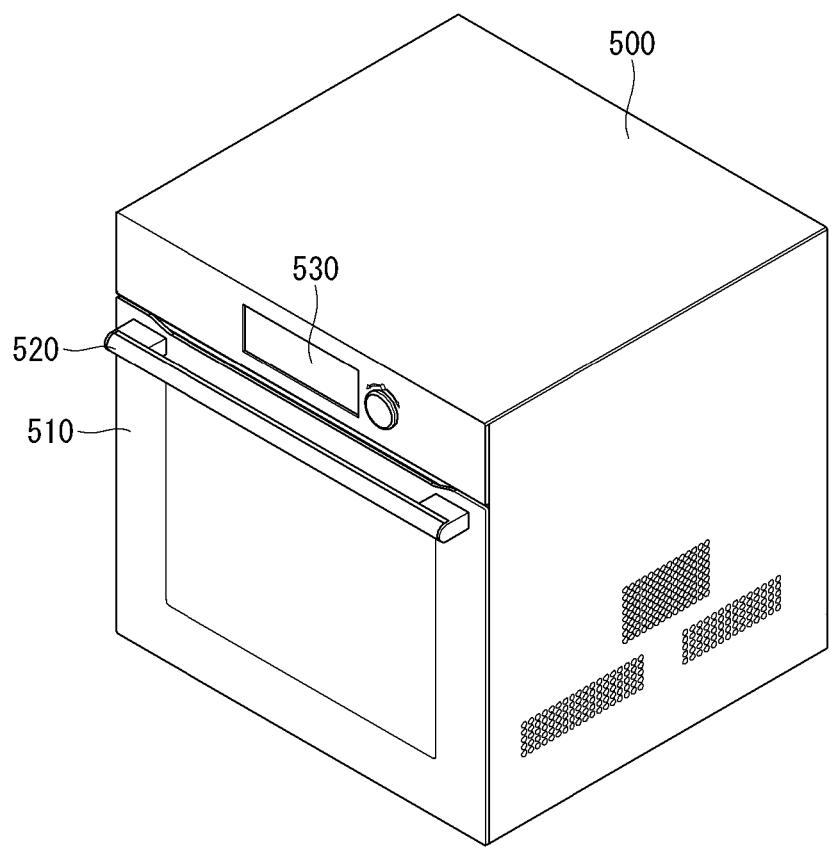

[FIG. 6]
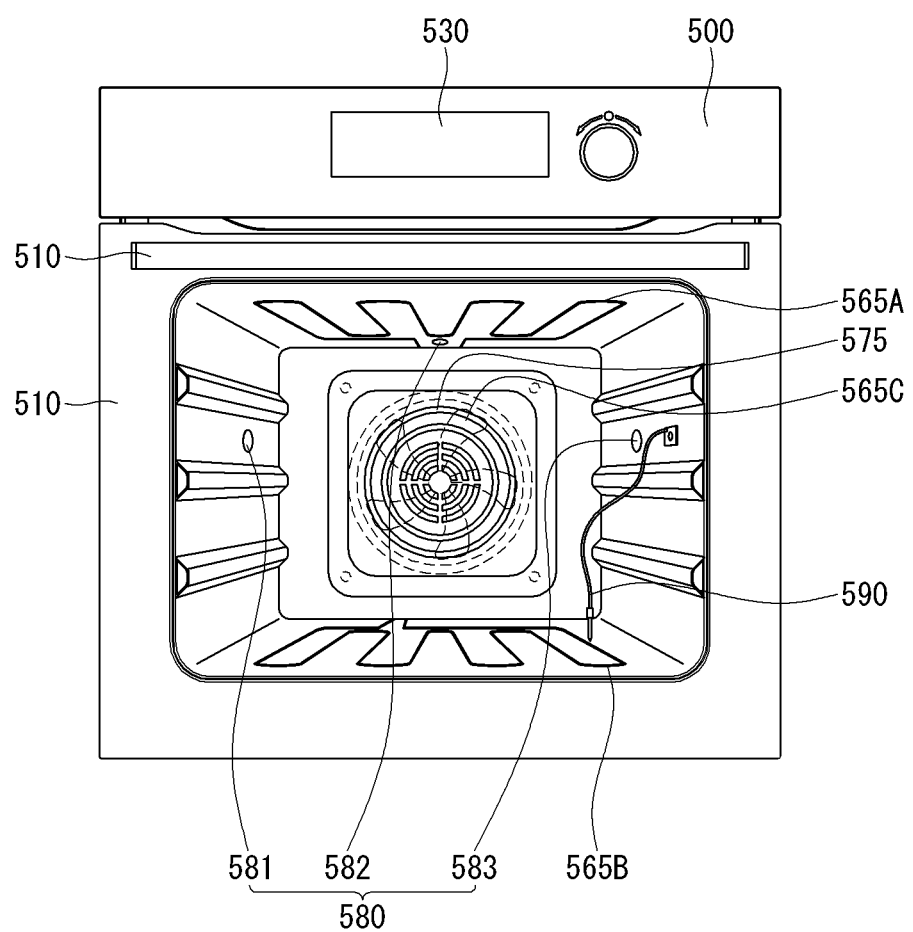

[FIG. 7]
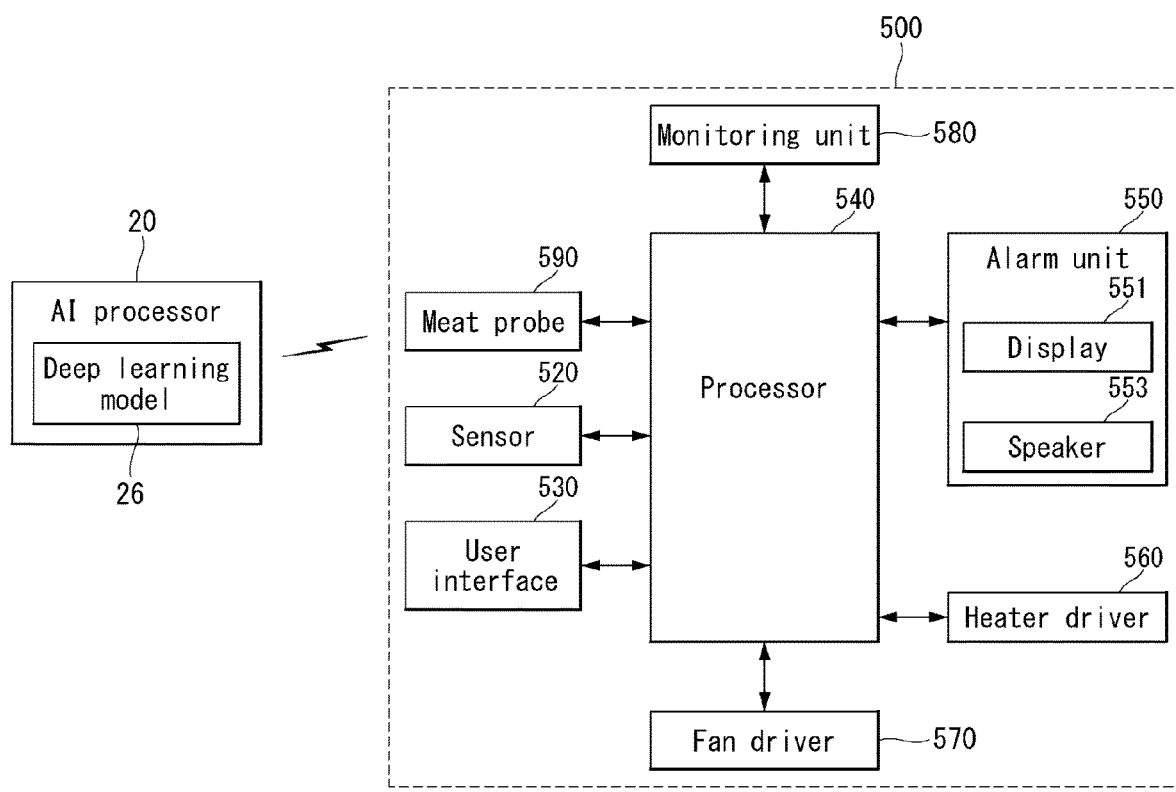

[FIG. 8]
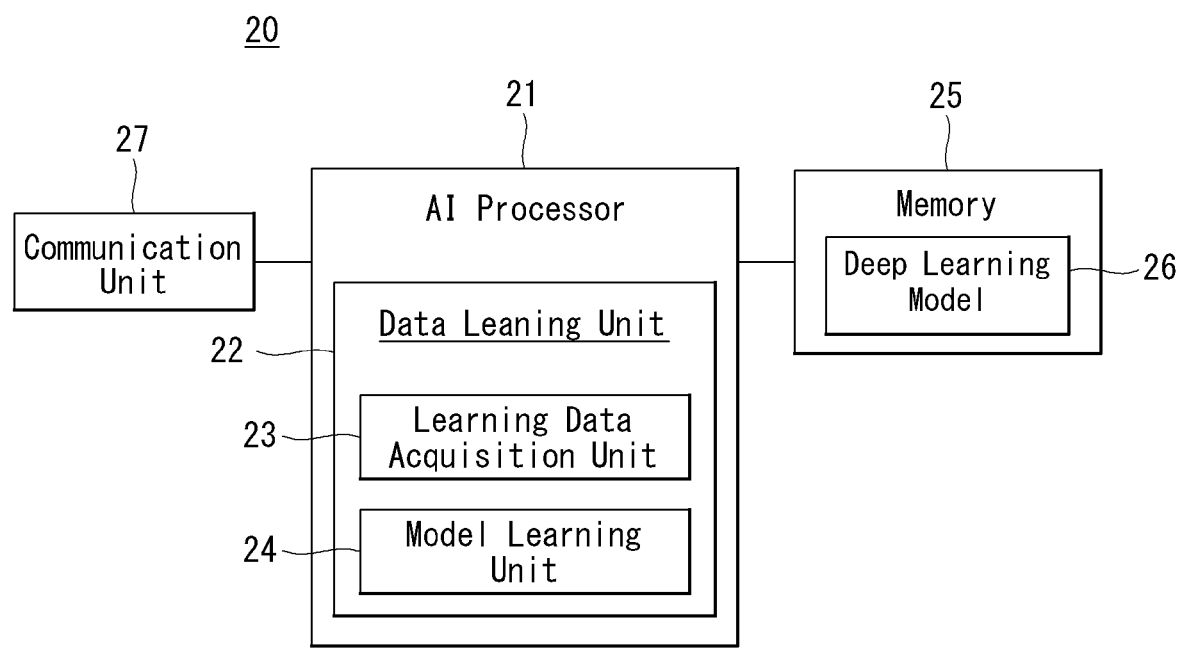

[FIG. 9]
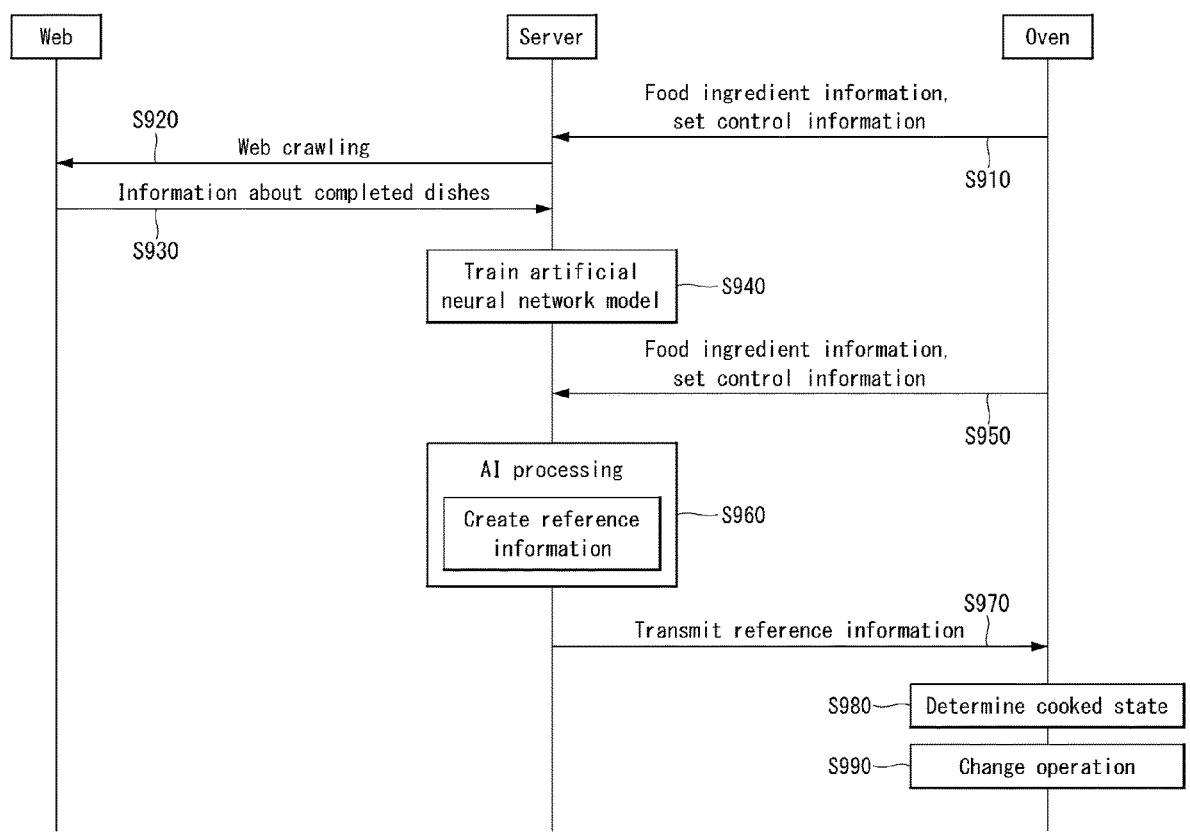

[FIG. 10]
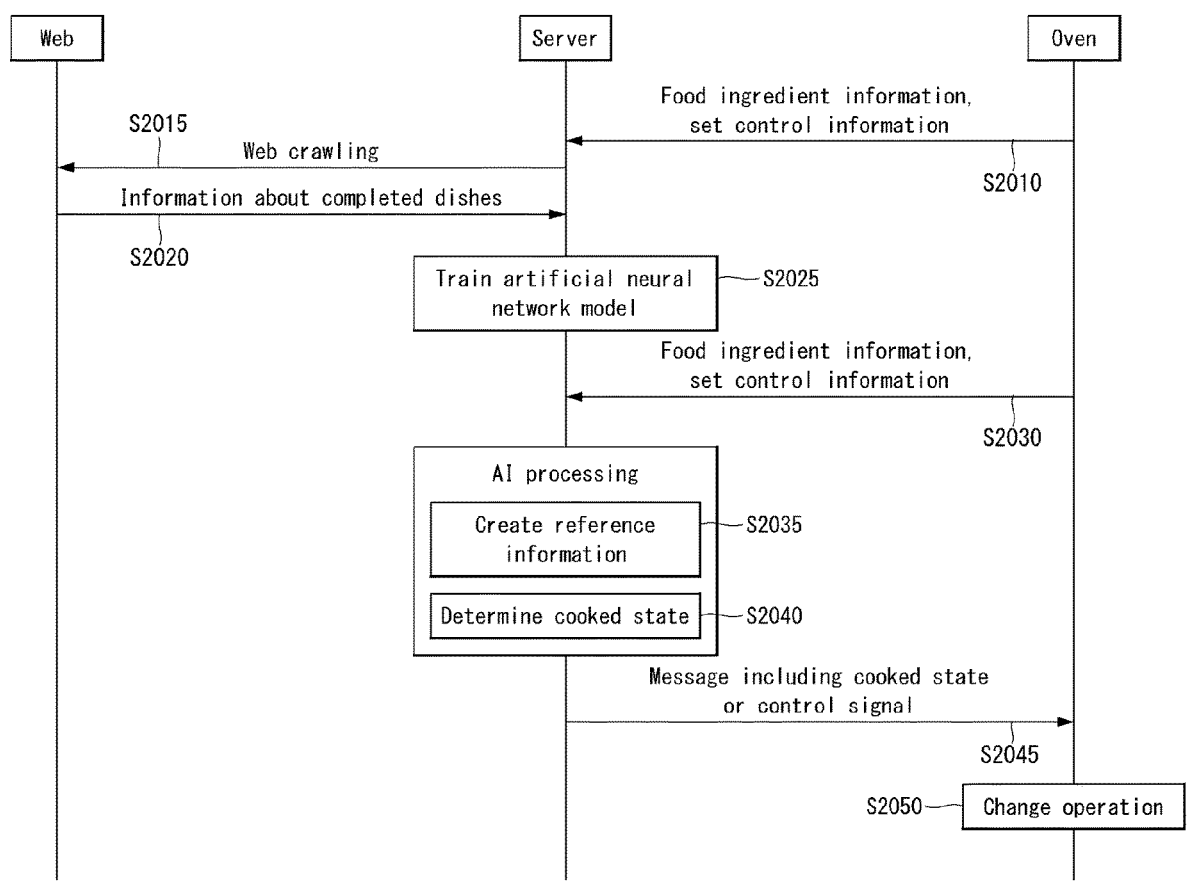

[FIG. 11]
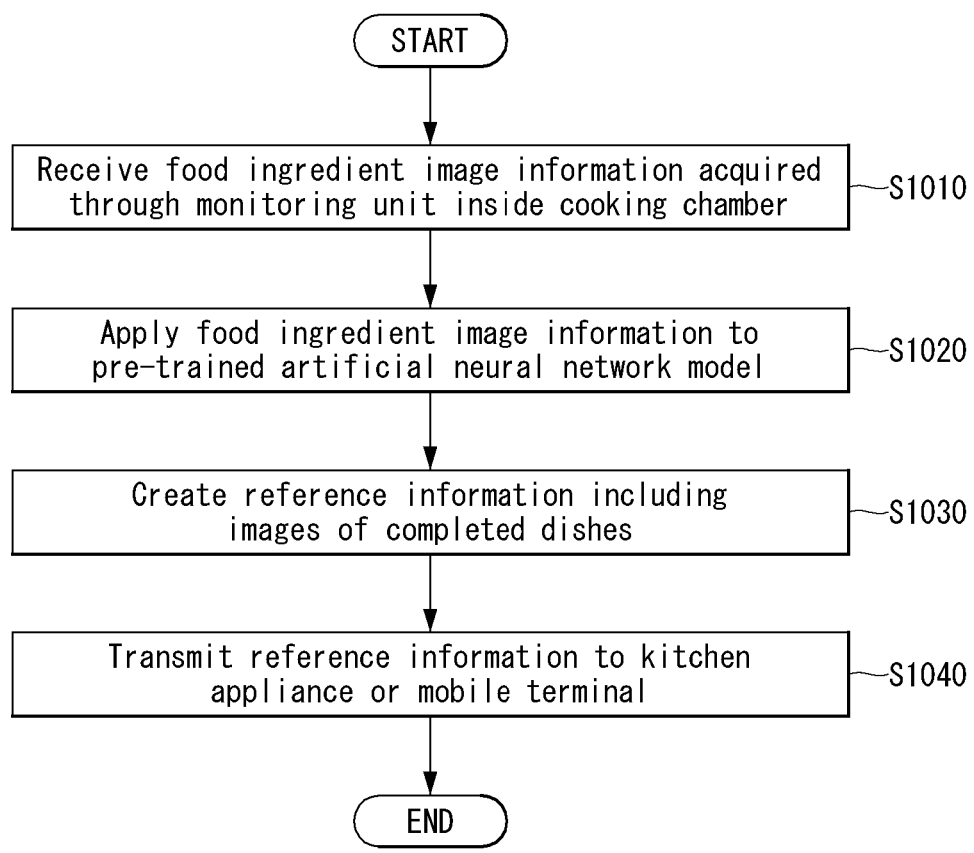

[FIG. 12]
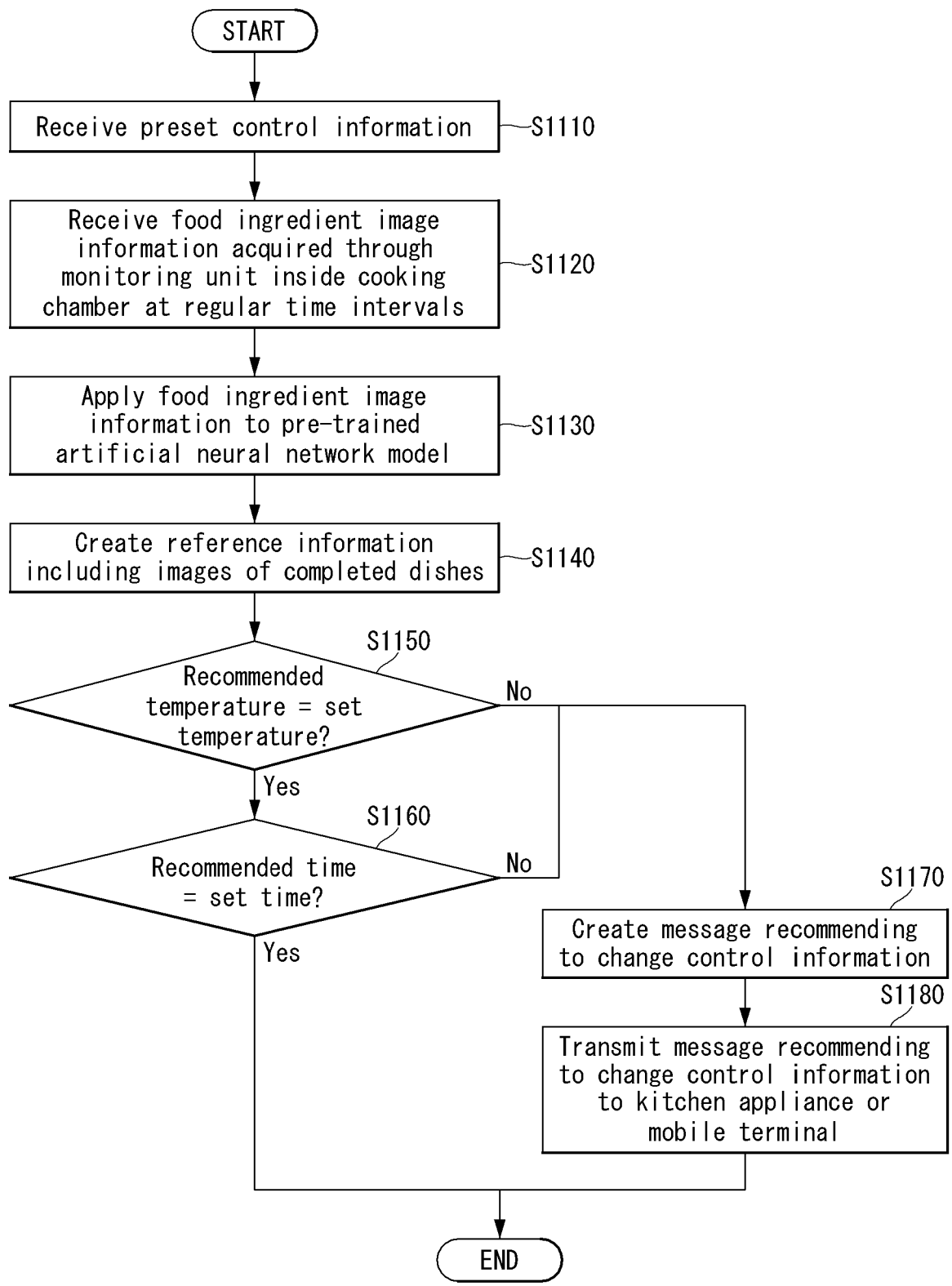

[FIG. 13]
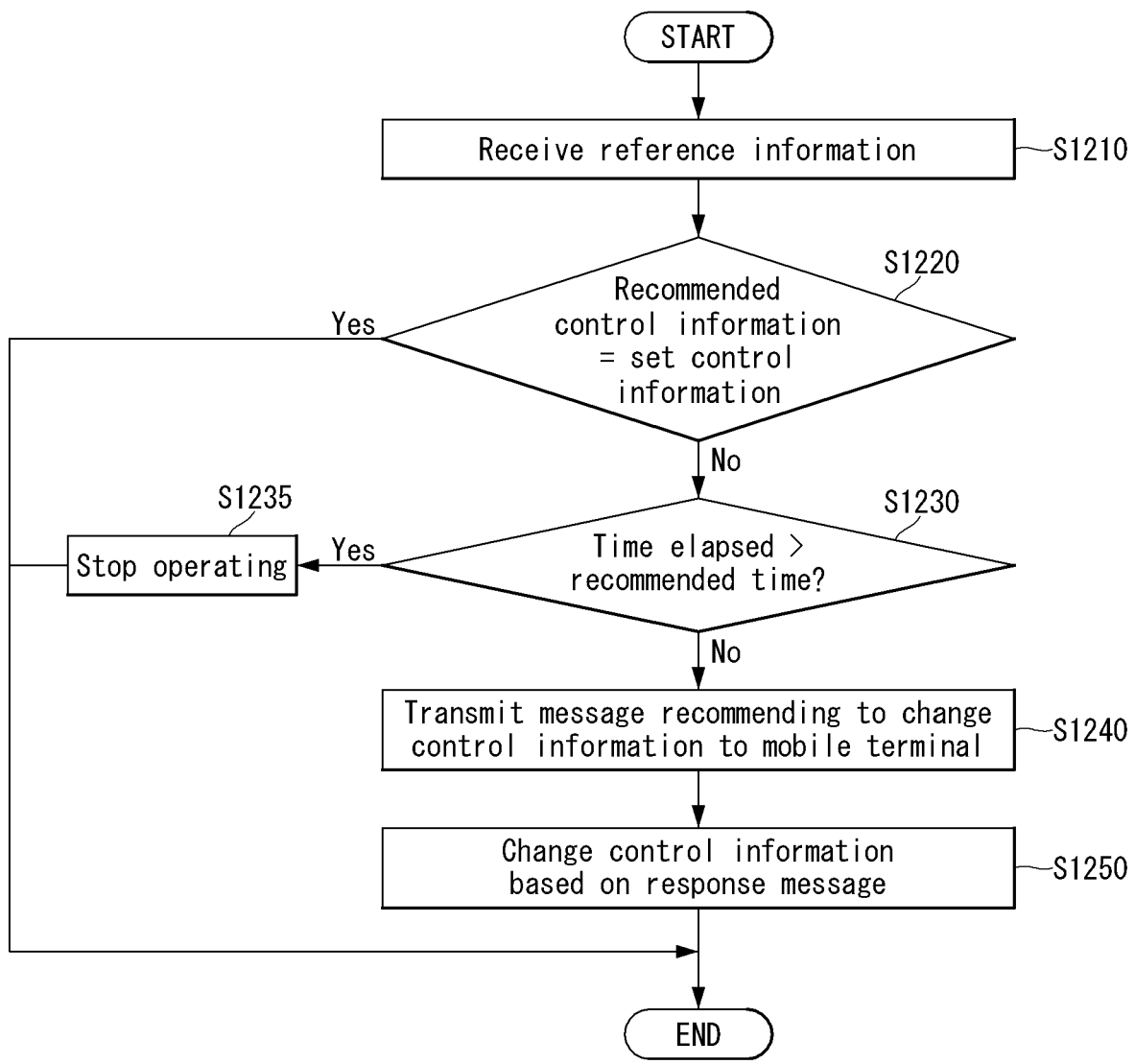

[FIG. 14]
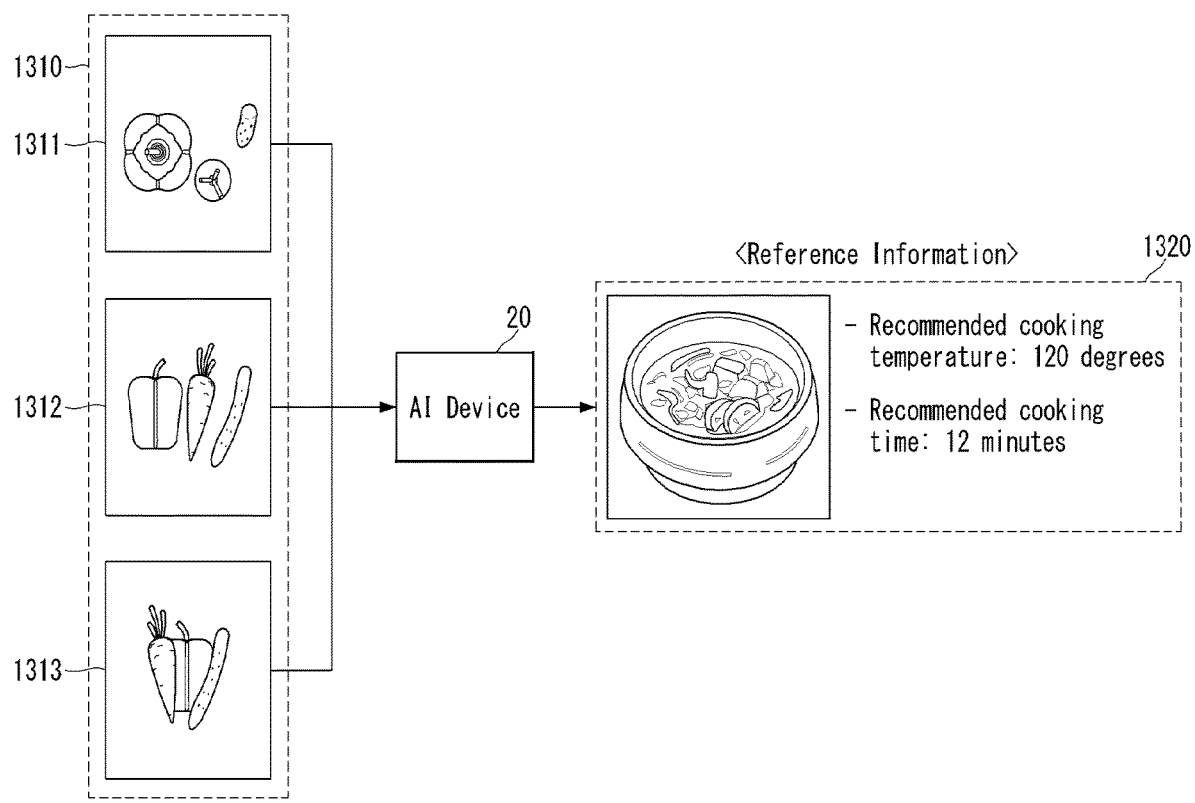

[FIG. 15]
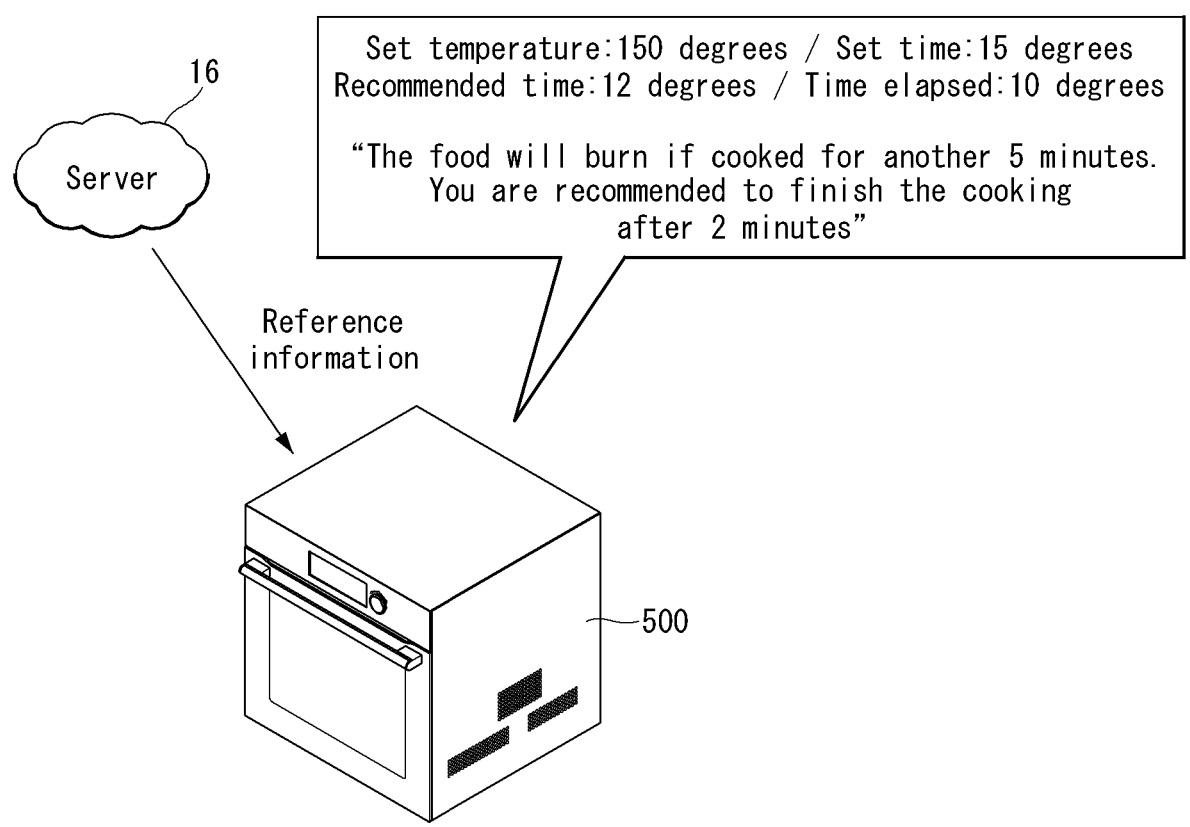

[FIG. 16]
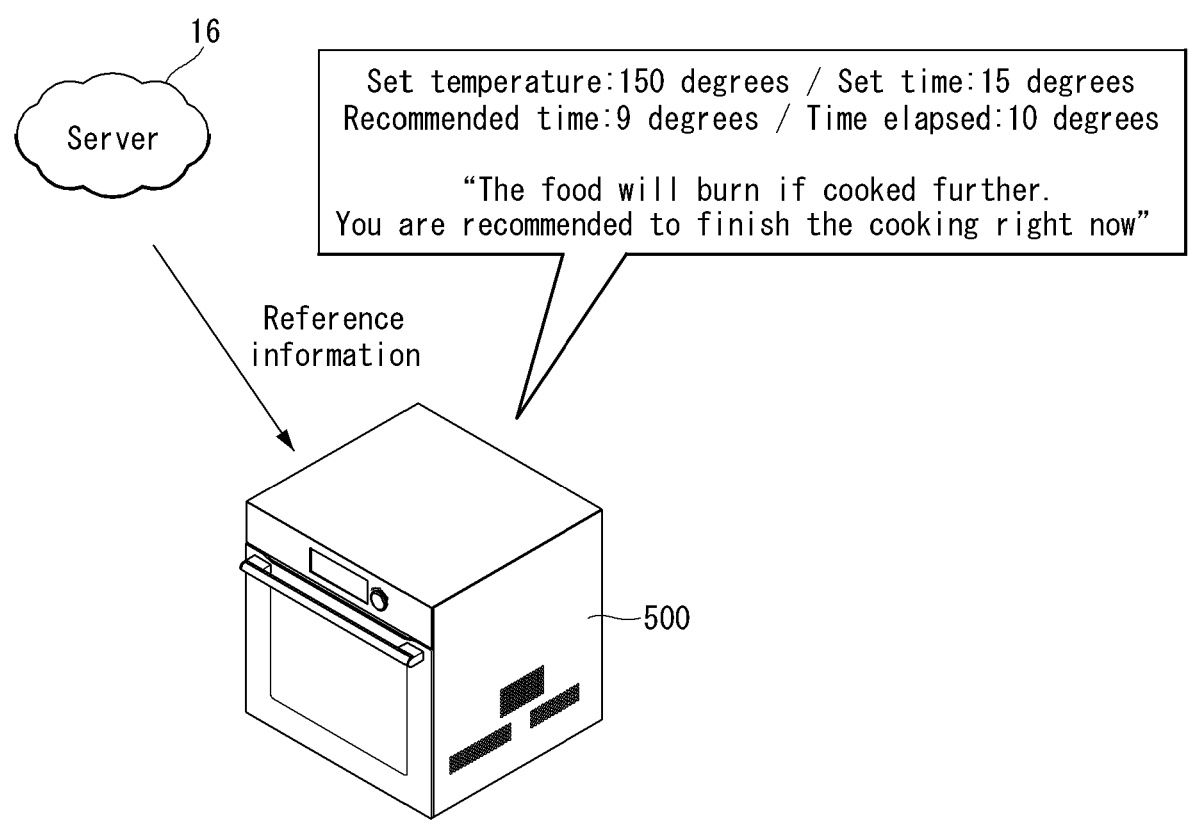

[FIG. 17]
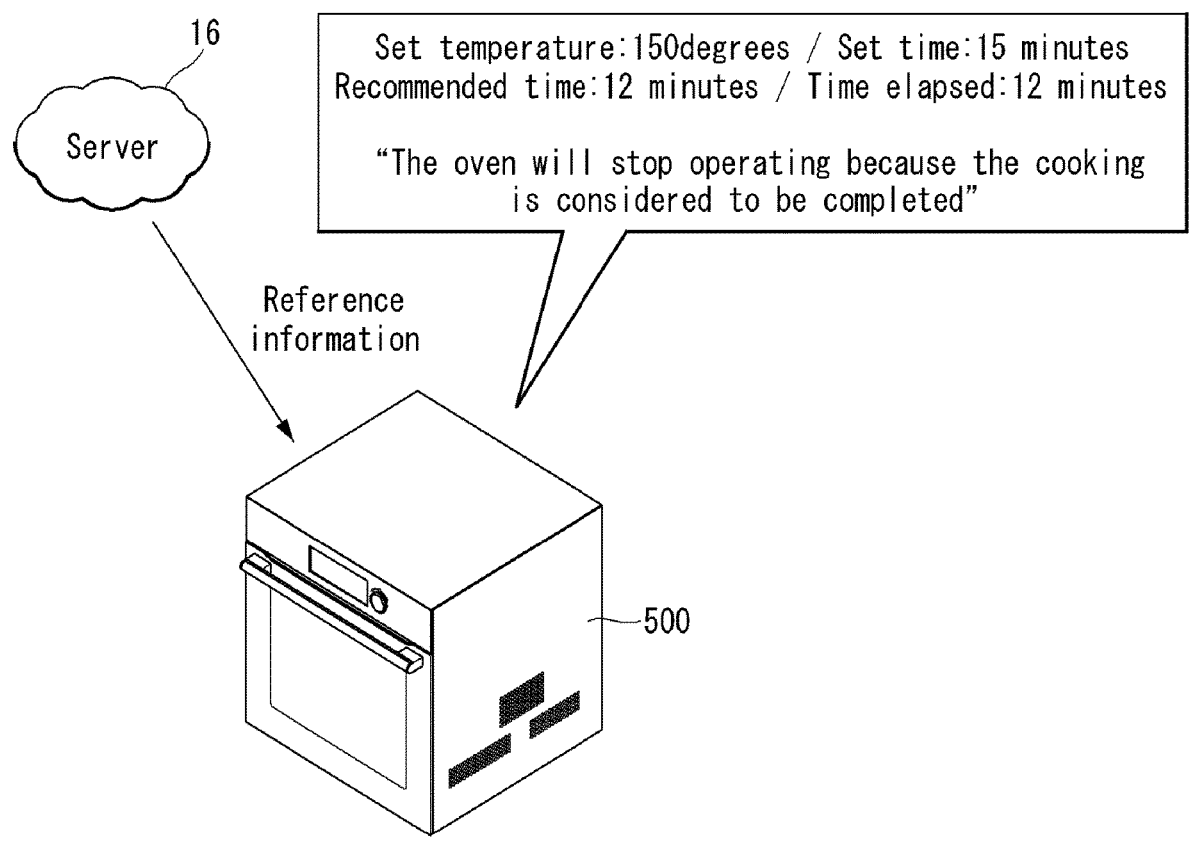

[FIG. 18]
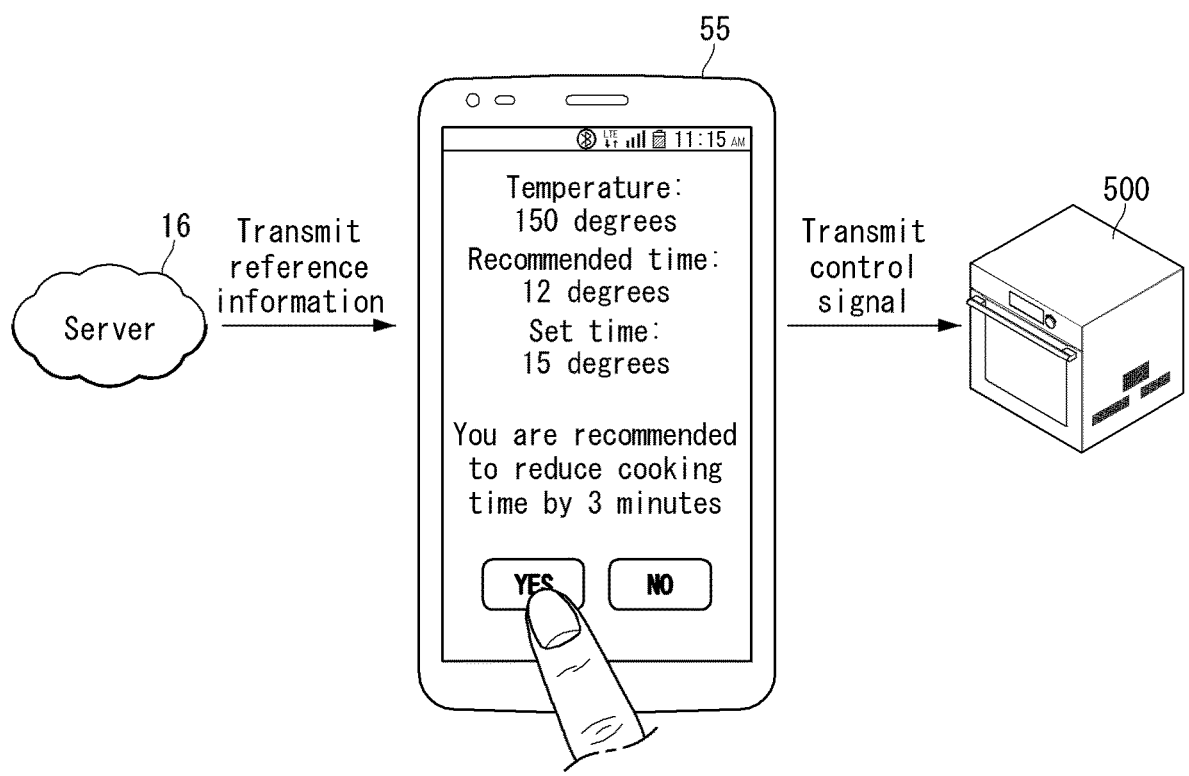

[FIG. 19]
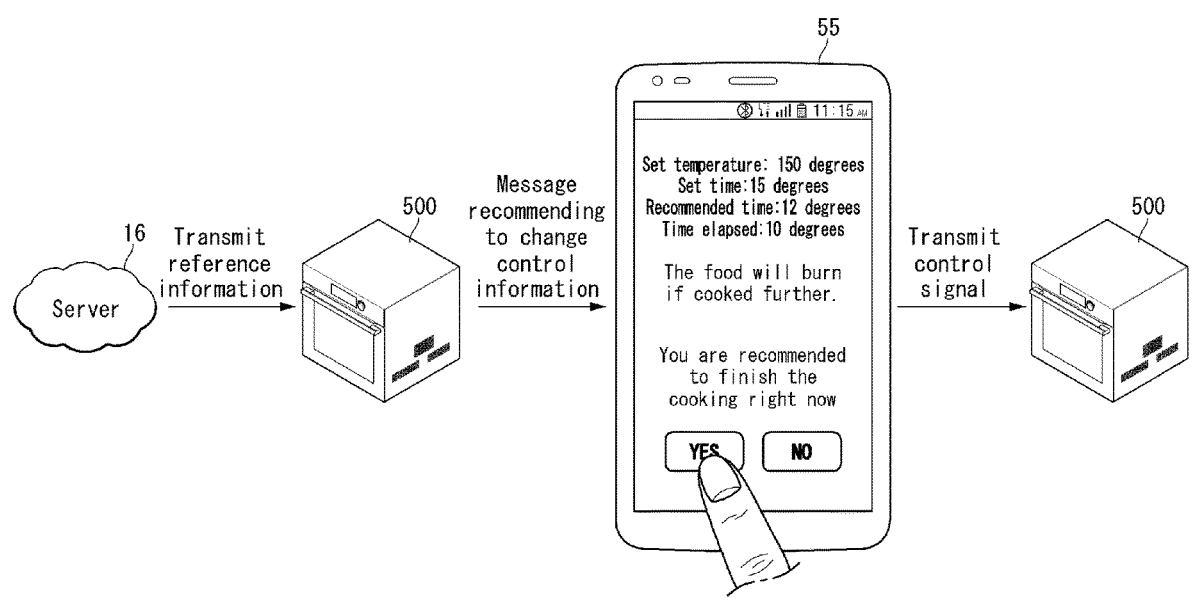

METHOD FOR CONTROLLING COOK BASED ON ARTIFICIAL INTELLIGENT AND INTELLIGENT DEVICE

CROSS-REFERENCE TO RELATED APPLICATION

Pursuant to 35 U.S.C. § 119(a), this application claims the benefit of earlier filing date and right of priority to Korean Patent Application No. 10-2019-0104209, filed on Aug. 26, 2019, the contents of which are hereby incorporated by reference herein in its entirety.

BACKGROUND OF THE INVENTION

Field of the Invention

The present disclosure relates to a method for controlling cooking based on artificial intelligence and an artificial intelligence device, more particularly, to a method for controlling cooking based on artificial intelligence and an artificial intelligence device which are capable of letting a user see how food in an oven is progressing.

Related Art

An artificial intelligence (AI) system is a computer system that achieve human-level intelligence, which, unlike existing rule-based smart systems, makes machines smart enough to learn and decide on their own. The more the artificial intelligence system is used, the higher its recognition rate and the better it understands a user's preferences. Hence, the existing rule-based smart systems are being gradually replaced by deep learning-based artificial intelligence systems.

Artificial intelligence technologies include machine learning and element technologies using machine learning.

Machine learning is an algorithm that classifies and learns features from input data on their own, whereas the element technologies are technologies that mimic human brain functions such as perception, decision making, etc. using machine learning algorithms such as deep learning, which include a number of technical fields, including language understanding, visual understanding, reasoning/prediction making, knowledge representation, motion control, etc.

Artificial intelligence technology can be applied to the following various subfields. Language understanding is concerned with recognizing, applying, and processing human language/text, which includes natural language processing, machine translation, question answering, speech recognition/synthesis. Visual understanding is concerned with recognizing and processing objects just as human vision does, which includes object recognition, object tracking, image retrieval, human recognition, scene understanding, spatial understanding, image enhancement, etc. Reasoning/prediction making is concerned with understanding information and making logical inferences and predictions, which includes knowledge/probability-based reasoning, optimal prediction, preference-based planning, recommendation, etc. Knowledge representation is concerned with the automated transformation of human experiences into knowledge data, which includes knowledge building (data creation/classification), knowledge management (application of data), etc. Motion control is concerned with controlling the driving of self-driving vehicles and the movement of robots, which includes movement control (navigation, collision, and driving), manipulation control (behavior control), etc.

In particular, artificial intelligence systems can be applied to ovens as well in order to resolve problems. Specifically, when cooking with an oven that operates at a specified temperatures and time, users may have difficulties even if they follow the same recipe, like getting food burnt or undercooked depending on the ingredients of the food, the condition of the oven, and each user's cooking skills.

SUMMARY OF THE INVENTION

An aspect of the present disclosure is to solve the above-described needs and/or problems.

Another aspect of the present disclosure is to provide a method for controlling cooking based on artificial intelligence and an artificial intelligence device which automatically stop an oven while cooking at a pre-set temperature and time, when it is predicted that the food in the oven will burn.

Another aspect of the present disclosure is to provide a method for controlling cooking based on artificial intelligence and an artificial intelligence device which automatically recommend a temperature and time by learning to cook dishes frequently cooked in an oven.

Another aspect of the present disclosure is to provide a method for controlling cooking based on artificial intelligence and an artificial intelligence device which recommend an optimal cooking time by continuously finding out the size and ingredients of a dish.

Another aspect of the present disclosure is to provide a method for controlling cooking based on artificial intelligence and an artificial intelligence device which can inform a user of necessary changes needed during the cooking of a dish by continuously monitoring how the dish is progressing.

An exemplary embodiment of the present disclosure provides a method for controlling cooking based on artificial intelligence, the method comprising: receiving first and second food ingredient image information acquired through a camera located inside a kitchen appliance; applying the first food ingredient image information to a pre-trained artificial neural network model; creating reference information including image information of completed dishes as results of applying the first food ingredient image information to the artificial neural network model; and determining the cooked state by comparing the second food ingredient information with the image information of completed dishes, wherein the first food ingredient image information may be image information acquired before cooking, and the second food ingredient image information may be image information acquired during cooking.

Furthermore, the camera may be located inside a cooking chamber of the kitchen appliance, and may comprise at least one among a first camera for capturing the top of the food ingredients, a second camera for capturing the left side of the food ingredients, and a third camera for capturing the right side of the food ingredients.

Furthermore, the artificial neural network model may be an artificial neural network model that is guided and trained on a training data set composed of the image information of completed dishes acquired by crawling the web and the user's cooking history information.

Furthermore, the reference information may further comprise recommended control information including recommended times and temperatures for the dishes.

Furthermore, the receiving of second food ingredient image information comprises receiving the second food ingredient image information at regular time intervals from the start of the cooking until the end of the cooking.

Furthermore, the second food ingredient image information may further comprise preset control information of the kitchen appliance and information on the time elapsed since the start of the cooking.

Furthermore, the method may further comprise transmitting the reference information or a message including the cooked state to the kitchen appliance or a mobile terminal.

Furthermore, the method may further comprise: creating a message recommending to change control information depending on the cooked state; and transmitting a message recommending to change the control information to the kitchen appliance or a mobile terminal, wherein the message recommending to change the control information may comprise a current cooked state, a cooking result expected to be yielded if no change is made, and recommended control information.

Furthermore, the method may further comprise: creating a signal for controlling the kitchen appliance depending on the cooked state; and transmitting the signal for controlling the kitchen appliance to the kitchen appliance.

Another exemplary embodiment of the present disclosure provides a method for controlling cooking based on artificial intelligence, the method comprising: acquiring first and second food ingredient image information through a camera located inside a cooking chamber where food ingredients are placed and transmitting the same to an external server; receiving reference information including image information of completed dishes from the external server; determining the cooked state by comparing the second food ingredient image information with the image information of completed dishes, wherein the first food ingredient image information may be image information acquired before cooking, and the second food ingredient image information may be image information acquired during cooking.

A still another exemplary embodiment of the present disclosure provides an artificial intelligence device comprising: a antenna that receives first and second food ingredient information from a network, which are acquired through a camera of a kitchen appliance; a memory; and a processor, wherein the first food ingredient image information may be image information acquired before cooking, and the second food ingredient image information may be image information acquired during cooking, and the processor may create reference information including image information of completed dishes by applying the first food ingredient image information to a pre-trained artificial neural network model, and determine the cooked state by comparing the second food ingredient image information with the image information of completed dishes.

A method for controlling cooking based on artificial intelligence and an artificial intelligence device according to an exemplary embodiment of the present disclosure have the following advantageous effects.

The present disclosure has the advantage of automatically stopping an oven while cooking at a pre-set temperature and time, when it is predicted that the food in the oven will burn.

Another advantage of the present disclosure is to automatically recommend a temperature and time by learning to cook dishes frequently cooked in an oven.

A still another advantage of the present disclosure is to recommend an optimal cooking time by continuously finding out the size and ingredients of a dish.

A further advantage of the present disclosure is to inform a user of necessary changes needed during the cooking of a dish by continuously monitoring how the dish is progressing.

It is to be understood that the advantages that can be obtained by the present disclosure are not limited to the aforementioned advantages and other advantages which are not mentioned will be apparent from the following description to the person with an ordinary skill in the art to which the present disclosure pertains.

BRIEF DESCRIPTION OF THE DRAWINGS

In order to help understanding of the present disclosure, the accompanying drawings which are included as a part of the detailed description provide embodiments of the present disclosure and describe the technical features of the present disclosure together with the detailed description.

FIG. 1 is a conceptual diagram of an example of an AI device.

FIG. 2 illustrates a block diagram of a wireless communication system to which methods proposed in this specification are applicable.

FIG. 3 is a view showing an example of a signal transmission/reception method in a wireless communication system.

FIG. 4 shows an example of how a user terminal and 4G network basically work in a 5G communication system.

FIG. 5 shows the exterior appearance of an oven range according to an exemplary embodiment of the present disclosure.

FIG. 6 shows the interior appearance of an oven range according to an exemplary embodiment of the present disclosure.

FIG. 7 is a block diagram of an oven range according to an exemplary embodiment of the present disclosure.

FIG. 8 is a block diagram of an AI device according to an exemplary embodiment of the present disclosure.

FIG. 9 is a sequence diagram of a method for controlling an artificial intelligence device according to an exemplary embodiment of the present disclosure.

FIG. 10 is a sequence diagram of a method for controlling an artificial intelligence device according to another exemplary embodiment of the present disclosure.

FIG. 11 is a flowchart of the creation of kitchen appliance control information according to an exemplary embodiment of the present disclosure.

FIG. 12 is a flowchart of the creation of kitchen appliance control information according to another exemplary embodiment of the present disclosure.

FIG. 13 is a flowchart showing a method for controlling a kitchen appliance according to an exemplary embodiment of the present disclosure.

FIG. 14 is an example of the creation of reference information according to an exemplary embodiment of the present disclosure.

FIGS. 15 to 19 are views showing examples of a method for controlling a kitchen appliance according to an exemplary embodiment of the present disclosure.

DESCRIPTION OF EXEMPLARY EMBODIMENTS

In what follows, embodiments disclosed in this document will be described in detail with reference to appended drawings, where the same or similar constituent elements are given the same reference number irrespective of their drawing symbols, and repeated descriptions thereof will be omitted.

In describing an embodiment disclosed in the present specification, if a constituting element is said to be "connected" or "attached" to other constituting element, it should be understood that the former may be connected or attached directly to the other constituting element, but there may be a case in which another constituting element is present between the two constituting elements.

Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present disclosure; rather, it should be understood that the appended drawings include all of the modifications, equivalents or substitutes described by the technical principles and belonging to the technical scope of the present disclosure.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present disclosure to be described below may be implemented by combining or modifying the respective embodiments to satisfy the aforementioned requirements of the 5G system.

FIG. 1 illustrates one embodiment of an AI device.

Referring to FIG. 1, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

Hereinafter, 5G communication (5th generation mobile communication) required by an apparatus requiring AI processed information and/or an AI processor will be described through paragraphs A through G.

A. Example of Block Diagram of UE and 5G Network

FIG. 2 is a block diagram of a wireless communication system to which methods proposed in the disclosure are applicable.

Referring to FIG. 2, a device (autonomous device) including an autonomous module is defined as a first communication device (910 of FIG. 2), and a processor 911 can perform detailed autonomous operations.

A 5G network including another vehicle communicating with the autonomous device is defined as a second communication device (920 of FIG. 2), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 2, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 3 is a diagram showing an example of a signal transmission/reception method in a wireless communication system.

Referring to FIG. 3, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 3.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 3.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter.

When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to "beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

FIG. 4 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 4, the autonomous vehicle performs an initial access procedure and a random access procedure with the 5G network prior to step S1 of FIG. 4 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 4 which are changed according to application of mMTC.

In step S1 of FIG. 4, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

FIG. 5 shows the exterior appearance of an oven range 500 according to an exemplary embodiment of the present disclosure. FIG. 6 shows the interior appearance of an oven range 500 according to an exemplary embodiment of the present disclosure. FIG. 7 is a block diagram of an oven range 500 according to an exemplary embodiment of the present disclosure.

The oven range 500 may comprise a gas oven range and an electric oven range. Generally, an oven range is an integrated kitchen appliance which is made by combining an oven which heats a dish's ingredients put into an enclosed area with dry heat and a range usually located on the top of the oven to directly heat the ingredients of the dish placed on the top. The oven range may be classified as a gas oven range or an electric oven range depending on the type of heat source.

The gas oven range 500 usually works by igniting and heating a number of burners, fueled by gas, and the electric oven range 500 works by heating with electricity by using various heaters such as a ceramic heater, sheath heater, and halogen heater.

Referring to FIG. 5, the oven range 500 comprises a cabinet (not shown) forming the exterior, a door 510 located at the front of the cabinet, and a handle 520 located on the door 510.

While an embodiment is shown in which a cooking chamber opens and closes as the upper end of the door 510 rotates up and down on the lower end when the handle 520 on the door 510 is pulled, the present disclosure is not to be limited by the axis of rotation of the door 510 and the direction of rotation of the door 510.

A user interface 530 may be provided on the front upper end of the cabinet, and various buttons required to operate the oven 500 or a display 551 for displaying the operating status of the oven 500 may be generally provided on the user interface 530.

The interior of the cabinet may comprise a cavity and a cooking chamber inside the cavity (see FIG. 6). Food ingredients may be fed into the cooking chamber, and afterwards the oven 500 may perform a cooking stroke.

A top heater 565A may be mounted on the top of the cooking chamber, and the top heater 565A may be exposed to the interior of the cooking chamber so that it can heat a food item with radiant heat inside the cooking chamber. Meanwhile, a convection heater 565C may be mounted in a space between the back side of the cavity and the corresponding part of the cabinet, and a convection fan 575 may be provided on the back side of the cavity where the convection heater 565C is mounted. Thus, the convection fan 575 may supply air heated by the convection heater 565C to the interior of the cooking chamber and at the same time distribute hot air evenly throughout the interior of the cooking chamber.

A meat probe 590 may be inserted into meat when cooking and function to measure and control heating temperature so as to control the output of each heater and enable automatic cooking.

The user interface 530 may be implemented on a touch panel of the display 551 or provided separately from the display 551. The user interface 530 may include various kinds of instruction buttons. Information on the cooking mode selected on the user interface 530 is transmitted to the processor 540. Moreover, the processor 540 may receive status information of the cooking chamber from various kinds of sensors 525 provided in the cooking chamber.

The display 551 may externally display information on various statuses of the cooking chamber and information on the selected cooking mode.

The sensors 525 may comprise a humidity sensor for sensing the humidity of the cooking chamber, a gas sensor for sensing the level of gas in the cooking chamber, and a temperature sensor for sensing the temperature of the cooking chamber. Further, the sensors 525 may comprise an image sensor, infrared sensor, etc. for identifying the state of food ingredients put into the cooking chamber.

An illuminator (not shown) may comprise at least one light-emitting device. The illuminator may emit light of different wavelengths. The illuminator may sequentially emit light of different wavelengths. For example, when capturing the food ingredients placed in the inside space of the oven 500, light of red, green, and blue wavelengths may be sequentially emitted to acquire a captured image of the food ingredients. To capture the food ingredients placed in the inside space of the oven 500, the oven 500 may use light in the visible light range, and may mix it with light in the infrared range when necessary. Light of an appropriate wavelength is required to find out the characteristics of the food ingredients depending on the types of the food ingredients. Thus, once the types of the food ingredients placed in the inside space, the oven 500 may sequentially emit light of a selected wavelength according to the types of the food ingredients. To find out the characteristics of the food ingredients placed in the inside space, the oven 500 may select and use light of a specific wavelength in the near infrared range, and may use light of a wavelength in the visible range when necessary.

According to an exemplary embodiment of the present disclosure, the illuminator may comprise a plurality of light-emitting devices that individually emit light of short wavelengths and a light guide that provides a light path through which light emitted from one selected from among the plurality of light-emitting devices.

A monitoring unit 580 may comprise at least one camera 581, 582, and 583. The camera 581, 582, and 583 may be provided on the left side, right side, or top side of the cooking chamber. The camera 581, 582, and 583 is a component that creates an image of electrical signal from an incident light, and may comprise at least one image sensor 525. The image sensor 525 may be a CCD (charge coupled device) image sensor 525 or CMOS (complementary metal oxide semiconductor) image sensor 525 which converts an optical signal into an electrical signal. The camera 581, 582, and 583 may capture an image using light of a single wavelength emitted from the illuminator. A capturing part may capture an image using light of a single wavelength and therefore may not use a filter used to pass light of a single wavelength through. In some cases, the camera 581, 582, and 583 may comprise a predetermined bandpass filter for passing light of predetermined single wavelengths.

The camera 581, 582, and 583 may further comprise a noise reduction filter for adjusting light of a noise wavelength entering the image sensor 525. The camera 581, 582, and 583 may further comprise a lens and a lens driver for adjusting the position of the lens.

A memory (not shown) may store a program for processing and controlling the processor 540, and may store data inputted into the oven 500 and outputted from the oven 500. The memory may store computer executable instructions.

The processor 540 typically controls the overall operation of the oven 500. The processor 540 may comprise at least one processor 540. The processor 540 may comprise a plurality of processors 540 or an integrated processor 540, depending on its functions and role.

The processor 540 may determine the cooked state of the food ingredients and control the operation of the oven 500, based on reference information received from an external server 16. The processor 540 may compare image information of the food ingredients put into the cooking chamber before cooking or information about the cooking process of the food ingredients being cooked with the reference information, derive an optimal recipe for the captured food ingredients, and control the cooking process according to the derived recipe. The cooking process information may comprise image information of the food ingredients being cooked and information on the time elapsed since the start of the cooking.

The processor 540 may determine the cooked state of the food ingredients based on the reference information, determine at least one among cooking method, cooking time, and cooking temperature based on the determined cooked state, and reflect at least one among the determined recommended method, recommended time, and recommended temperature into the cooking process. The cooking method may be direct cooking, convection cooking, steam cooking, RF cooking, etc. The cooking time may be a set amount of time needed to complete cooking the food ingredients or the time elapsed since the start of the cooking. The cooking temperature may be a temperature needed to complete cooking the food ingredients or a current temperature in the cooking process.

When there is a passage of time or a change in cooked state while controlling the oven 500, the processor 540 may determine the current cooked state based on the reference information. Based on results of this determination, the processor 540 may set, change, and maintain the recommended temperature, recommended time, recommended method, etc.

The processor 540 may continuously obtain information about the cooking process of the food ingredients through the monitoring unit 580, and predict the cooked state of the food ingredients and the time of completion of the cooking. For example, the processor 540 may predict the degree of cooking of the food ingredients by obtaining information about degeneration of the food ingredients through analysis of reflected waves, or may predict the degree of cooking of the food ingredients based temperature changes and temporal changes by continuously measuring the temperature of the food ingredients through the temperature sensor 525.

The processor 540 may check the degree of cooking of the food ingredients through analysis of the spectral characteristics of reflected light by pre-defining what sensing information to detect throughout the cooking process of the food ingredients and selectively radiating light of a wavelength used in the acquisition of the sensing information.

The processor 540 may be manufactured in the form of a hardware chip for artificial intelligence, or may be manufactured using an existing universal processor (for example, CPU or AP) and a processor dedicated to graphics (for example, GPU) and provided in the oven 500.

The processor 540 may obtain captured image information of the food ingredients through the monitoring unit 580 and obtain images of a completed dish matching a guided learning label by crawling the web. The artificial neural network model the processor 540 uses to create reference information for the captured food ingredients is an artificial neural network model that is guided and trained on a training set of completed dish images acquired by crawling the web. The training set is not limited to information acquired by crawling the web, and may be updated depending on the user's cooking history information and information about completed dishes entered directly by the user.

The processor 540 may have criteria for selecting data for each data type included in the training set, and may select data required for training by using these criteria. The processor 540 may learn criteria for determining what dishes the user can make with a combination of specific food ingredients. Also, the processor 540 may learn criteria about which learning data to use from information on the specific food ingredients. For example, food ingredients such as potatoes, chicken, green onions, and Korean red pepper paste sauce placed into the oven 500 may turn into a dish like roasted chicken with Korean red pepper paste sauce or spicy braised chicken. To distinguish between these dishes, the processor 540 may extract data like the arrangement of the food ingredients, the composition, the amount of sauce, the proportions of the ingredients, etc. from captured images, and may learn criteria for determining what dishes the user can make based on this data.

The processor 540 may comprise a heater driver 560 for driving the heater in response to a control signal, a signal sound generator, and a fan driver 570.

FIG. 8 is a block diagram of an AI device according to an embodiment of the present disclosure.

An AI device 20 may include an electronic device including an AI module that can perform AI processing, a server including the AI module, or the like. Further, the AI device 20 may be included as at least one component of the oven 500 shown in FIG. 7 to perform together at least a portion of the AI processing.

The AI processing may include all operations related to driving of the oven 500 shown in FIG. 7. For example, an autonomous vehicle can perform operations of processing/determining, and control signal generating by performing AI processing on sensing data or driver data. Further, for example, an autonomous vehicle can perform autonomous driving control by performing AI processing on data acquired through interaction with other electronic devices included in the vehicle.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a oven.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device. For example, external electronic devices may include Bluetooth device, autonomous vehicle, robot, drone, AR device, mobile device or home appliance.

Meanwhile, the AI device 20 shown in FIG. 7 was functionally separately described into the AI processor 21, the memory 25, the communication unit 27, etc., but it should be noted that the aforementioned components may be integrated in one module and referred to as an AI module.

FIG. 9 is a sequence diagram of a method for controlling an artificial intelligence device according to an exemplary embodiment of the present disclosure. In the specification below, a home appliance comprises the oven 500, and the oven 500 and the home appliance may be interchangeably used.

Referring to FIG. 9, the server 16 may acquire food ingredient image information and preset control information from the oven 500 (S910). The monitoring unit 580 of the oven 500 may comprise at least one camera 581, 582, and 583. The camera 581, 582, and 583 provided in the monitoring unit 580 may capture the food placed in the cooking chamber and store captured images. The oven 500 may transmit the stored captured images to the external server 16 connected via communication.

The food ingredient image information may include images of the food ingredients placed in the cooking chamber through the monitoring unit 580. It comprises first food ingredient image information acquired before cooking and second food ingredient image information acquired during cooking. In this case, the first food ingredient image information may be applied to an artificial neural network model stored in the AI device 20 and used to create reference information including image information of completed dishes. The second food ingredient image information may be used to determine the cooked state of the food ingredients being cooked by being compared with the image information of completed dishes included in the reference information.

The preset control information comprises the cooking method, cooking temperature, cooking time, etc. of the oven 500. The control information may be inputted directly from the user via the user interface 530, or may be set by a control signal received from the user's mobile terminal connected via communication. The oven 500 may obtain this control signal and transmit it to the external server 16.

The server 16 may acquire information about completed dishes by crawling the web and train the artificial neural network model (S920, S930, and S940). The acquired information about completed dishes may be used to train the artificial neural network model stored in the AI module of the server 16. The information about completed dishes is information that comprises image information of completed dishes and the cooking times, cooking temperatures, cooking methods, etc. recommended for the completed dishes. If there is a number of different recipes for a single dish, the artificial neural network model may be trained based on information about completed dishes that are considered most favored by the general public by taking account of the number of clicks to the websites, the number of likes, and so on.

According to an exemplary embodiment of the present disclosure, the user's own personal database, as well as the information about completed dishes, may be included. The user's own personal database may include the user's cooking history, information about favorite foods, and the user's ratings on dishes cooked based on control information recommended by the artificial intelligence device. The above-mentioned training set may be updated with specific data from the user's own personal database, and the artificial neural network model may be trained over again based on the updated training set. With repeated training, the artificial intelligence device offers the advantage of providing a specific user with information with higher accuracy.

The server 16 may receive food ingredient image information and preset control information from the oven 500 before cooking or during cooking (S950). After training the artificial neural network model, the server 16 may receive food ingredient image information from the oven 500 before cooking or during cooking and apply it to the artificial neural network model. The image information and control information may be transmitted before cooking to give the user guidance on control information recommended for optimal cooking, and the image information and control information may be transmitted during cooking to monitor how the food ingredients are progressing.

The server 16 may create reference information based on the food ingredient image information received from the oven 500 (S960). The reference information may comprise recommended control information including image information of completed dishes and recommended times and temperatures for the dishes. The server 16 may apply first food ingredient image information to the artificial neural network model and create reference information based on an output from the artificial neural network model.

The server 16 may transmit the reference information to the oven 500 or mobile terminal (S970). The server 16 may transmit the reference information to the oven 500 or mobile terminal connected via communication, and the oven 500 may display the received reference information through the display 551 or a speaker 553. The mobile terminal too may display the received reference information through a display or a speaker.

The oven 500 may recommend a cooking method for the food ingredients or determine the current cooked state, based on the received reference information (S980). The oven 500 may determine the cooked state of the food ingredients by comparing the current food ingredient image information and control information acquired through the monitoring unit 580 with the reference information by the processor 540. The oven 500 may determine the cooked state on its own, even without input from the user, including determining whether the food ingredients are burnt, undercooked, or being properly cooked.

If further operation is deemed inappropriate based on the current cooked state, the oven 500 may stop operating or change the operation corresponding to the control information preset by the user (S990). For example, if the food ingredients are expected to be burnt or undercooked if they cooked until a preset cooking time or preset cooking temperature is reached, the oven 500 may transmit a message asking the user's mobile terminal to change the control information, or the oven 500 itself may change its control information even if the control information is not changed by the user. For example, if it is determined that the food item will be overcooked or may cause fire if they cooked for a preset cooking time to a currently set cooking temperature, the oven 500 may stop operating itself upon detecting that the cooking is completed.

FIG. 10 is a method for controlling an artificial intelligence device according to another exemplary embodiment of the present disclosure.

Referring to FIG. 10, the server 16 may acquire food ingredient image information and preset control information from the oven 500 (S2010). The monitoring unit 580 of the oven 500 may comprise at least one camera 581, 582, and 583. The camera 581, 582, and 583 provided in the monitoring unit 580 may capture the food placed in the cooking chamber and store captured images. The oven 500 may transmit the stored captured images to the external server 16 connected via communication.

The preset control information comprises the cooking method, cooking temperature, cooking time, etc. of the oven 500. The control information may be inputted directly from the user via the user interface 530, or may be set by a control signal received from the user's mobile terminal connected via communication. The oven 500 may obtain this control signal and transmit it to the external server 16.

The server 16 may acquire information about completed dishes by crawling the web and train the artificial neural network model (S2015, S2020, and S2025). The acquired information about completed dishes may be used to train the artificial neural network model stored in the AI module of the server 16. The information about completed dishes is information that comprises image information of completed dishes and the cooking times, cooking temperatures, cooking methods, etc. recommended for the completed dishes. If there is a number of different recipes for a single dish, the artificial neural network model may be trained based on information about completed dishes that are considered most favored by the general public by taking account of the number of clicks to the websites, the number of likes, and so on.

According to an exemplary embodiment of the present disclosure, the user's own personal database, as well as the information about completed dishes, may be included. The user's own personal database may include the user's cooking history, information about favorite foods, and the user's ratings on dishes cooked based on control information recommended by the artificial intelligence device. The above-mentioned training set may be updated with specific data from the user's own personal database, and the artificial neural network model may be trained over again based on the updated training set. With repeated training, the artificial intelligence device offers the advantage of providing a specific user with information with higher accuracy.

The server 16 may receive food ingredient image information and preset control information from the oven 500 during cooking (S2030). The food ingredient image information may include images of the food ingredients placed in the cooking chamber through the monitoring unit 580. It comprises first food ingredient image information acquired before cooking and second food ingredient image information acquired during cooking. In this case, the first food ingredient image information may be applied to an artificial neural network model stored in the AI device 20 and used to create reference information including image information of completed dishes. The second food ingredient image information may be used to determine the cooked state of the food ingredients being cooked by being compared with the image information of completed dishes included in the reference information.

After training the artificial neural network model, the server 16 may apply the first food ingredient image information received from the oven 500 to the artificial neural network model. The first food ingredient image information and control information may be transmitted before cooking to give the user guidance on control information recommended for optimal cooking, and the second food ingredient image information and control information may be transmitted during cooking to monitor how the food ingredients are progressing.

The server 16 may create reference information based on the first food ingredient image information received from the oven 500 (S2035). The reference information may comprise recommended control information including image information of completed dishes and recommended times and temperatures for the dishes. The server 16 may apply first food ingredient image information to the artificial neural network model and create reference information based on an output from the artificial neural network model.

The server 16 may determine the cooked state of the food ingredients by comparing the image information of completed dishes included in the reference information and the second food ingredient image information (S2040). The image information of completed dishes may further comprise image information of each step of the cooking process from the start of the cooking until the end of the cooking. The server 16 may effectively monitor the cooked state by receiving the second food ingredient image information at regular time intervals from the start of the cooking until the end of the cooking and comparing it with the image information of completed dishes. For example, the server 16 may receive the second food ingredient image information from the oven 500 at 1 minute intervals and determine how the food ingredients are progressing during cooking based on the second food ingredient image information. The cooked state may include undercooked, burnt, well-cooked, best-cooked, etc.

The server 16 may transmit to the oven 500 a message including the cooked state or a signal for controlling the operation of the oven 500 (S2045). The server 16 may create a message including the cooked state determined by the aforementioned AI processing and transmit it to the mobile terminal or oven 500 to ask the user for a response. Also, the server 16 may create a signal for controlling the operation of the oven 500. In accordance with the signal for controlling operation, the server 16 may change the operation of the oven 500 (refer to S2050).

If further operation is deemed inappropriate based on the current cooked state, the oven 500 may stop operating or change the operation corresponding to the control information preset by the user (S2050). For example, if the food ingredients are expected to be burnt or undercooked if they cooked until a preset cooking time or preset cooking temperature is reached, the oven 500 may transmit a message asking the user's mobile terminal to change the control information, or the oven 500 itself may change its control information, even if the control information is not changed by the user. For example, if it is determined that the food item will be overcooked or may cause fire if they cooked for a preset cooking time to a currently set cooking temperature, the oven 500 may stop operating itself upon detecting that the cooking is completed. In another example, if the reference information indicates that the time elapsed since the start of the cooking does not meet the recommended time, or the results of comparison between the image information of completed dishes and the second food ingredient image information show that further cooking is required, the oven 500 may extend the cooking time.

FIG. 11 is a flowchart of the creation of kitchen appliance control information according to an exemplary embodiment of the present disclosure.

Referring to FIG. 11, first of all, the server 16 may receive food ingredient image information acquired through a monitoring unit located inside the cooking chamber of the oven 500 (S1010). The monitoring unit 580 of the oven 500 may comprise at least one camera 581, 582, and 583. The camera 581, 582, and 583 provided in the monitoring unit 580 may capture the food placed in the cooking chamber and store captured images. The oven 500 may transmit the stored captured images to the external server 16 connected via communication.

The server 16 may apply the food ingredient image information to a pre-trained artificial neural network model (S1020).

The server 16 may create reference information including information about completed dishes (S1030). The server 16 may apply the aforementioned input data to the artificial neural network model and create reference information based on an output from the artificial neural network model. As described above, the reference information may comprise images of completed dishes, recommended cooking time, cooking temperature, cooking method, etc.

The server 16 may transmit the reference information to the oven 500 or mobile terminal (S1040). The server 16 may transmit the reference information to the oven 500 or mobile terminal connected via communication, and the oven 500 may display the received reference information through the display 551 or a speaker 553. The mobile terminal too may display the received reference information through the display 551 or a speaker 553.

FIG. 12 is a flowchart of the creation of kitchen appliance control information according to another exemplary embodiment of the present disclosure. In the specification below, what has been described above with reference to FIGS. 9 to 11 will be omitted or just briefly mentioned.

Referring to FIG. 12, first of all, the server 16 may receive preset control information from the oven 500 (S1110).

The server 16 may receive food ingredient image information from the oven 500 at regular time intervals, which is acquired through a monitoring unit inside the cooking chamber (S1120).

The server 16 may apply the food ingredient image information to a pre-trained artificial neural network model (S1130).

The server 16 may create reference information based on an output from the artificial neural network model (S1140).

The server 16 may determine whether the preset control information is appropriate for optimal cooking or not by comparing the recommended temperature and recommended time in the reference information with the preset cooking temperature and cooking time of the oven (S1150 and S1160). That is, the server 16 as well as the oven 500 may determine the cooked state by comparing the reference information stored in the memory and the received food ingredient image information. Specifically, the cooked state may be determined by comparing the recommended temperature and time in the reference information with the preset cooking temperature and time elapsed since the start of the cooking received from the oven 500. Unless either the cooking temperature or cooking time meets recommended control information, it may be determined that the preset control information needs to be changed.

If the server 16 determines that the preset control information is inappropriate for optimal cooking, it may create a message recommending to change the control information and transmit it to the oven 500 or the user's mobile terminal (S1170 and S1180). The message recommending to change the control information comprises current cooked state information, a cooking result expected to be yielded if no change is made, a signal for controlling with the recommended control information, and so on. The signal for controlling with the recommended control information may include information about changing the cooking time, cooking temperature, cooking method, etc. Upon receiving the message recommending to change the control information, the oven 500 may change the control information in accordance with the information contained in the message recommending to change the control information, or may output the information contained in the message through the display 551 or speaker 553. Also, the server 16 may transmit the message recommending to change the control information to the mobile terminal. The user may enter a response as to whether to change the control information or not through a touch panel of the display 551 of the mobile terminal. The mobile terminal may transmit a message including the user's response to the oven 500. The oven 500 may change the control information or continue the current operation according to the user's response. In this case, the oven 500 may transmit the control information, along with images of the current cooked state of the food ingredients acquired through the monitoring unit 580 of the oven 500. This offers the advantage of allowing the user to see images of the cooked state of the food ingredients and decide more correctly whether to continue the cooking or not.

FIG. 13 is a flowchart showing a method for controlling a kitchen appliance according to an exemplary embodiment of the present disclosure.

Referring to FIG. 13, first of all, the oven 500 may receive reference information from the server 16 (S1210).

The oven 500 may predict the cooked state of the food ingredients by comparing recommended control information with preset control information based on reference information received from the server 16 (S1220 and S1230). The oven 500 may determine the cooked state of the food ingredients by comparing the current food ingredient image information and control information acquired through the monitoring unit 580 with the reference information by the processor 540. The oven 500 may determine the cooked state on its own, even without input from the user, including determining whether the food ingredients are burnt, undercooked, or being properly cooked.

If the time elapsed since the start of the cooking exceeds a recommended time, the oven 500 may stop operating itself (S1235). For example, if the food ingredients are expected to be burnt or undercooked if they cooked until a preset cooking time or preset cooking temperature is reached, the oven 500 may transmit a message asking the user's mobile terminal to change the control information, or the oven 500 itself may change its control information if the control information is not changed by the user. For example, if it is determined that the food item will be overcooked or may cause fire if they cooked for a preset cooking time to a currently set cooking temperature, the oven 500 may stop operating itself upon detecting that the cooking is completed.

The oven 500 may transmit a message recommending to change the control information to the mobile terminal (S1240).

The oven 500 may change the control information of the oven 500 based on a response message received from the mobile terminal (S1250). For example, if the time elapsed since the start of the cooking exceeds the recommended time, the oven 500 may stop operating. In another example, if the time elapsed since the start of the cooking exceeds the recommended time or falls short of the recommended time, the oven 500 may consider the food item undercooked and extend the cooking time.

FIG. 14 is an example of the creation of reference information according to an exemplary embodiment of the present disclosure.

Referring to FIG. 14, three side images 1310 acquired through the monitoring unit 580 of the oven 500 may comprise a top image 1311, a left side image 1312, and a right side image 1313. The food ingredients may be stereoscopically analyzed by using the acquired images 1311, 1312, and 1313. For example, the processor 540 of the external server 16 may combine overlapping portions of the images 1311, 1312, and 1313 to create a single image. The created single image may comprise stereoscopic image information of a specific object. Also, uncaptured portions too may be created by predicting pixel information based on information of the three side images.

The server 16 may create reference information 1320 by applying the three side images 1310 to a pre-trained artificial neural network model, and the reference information 1320 may comprise recommended control information including the cooking time and cooking temperature for the dish. Further, the reference information 1320 may comprise images of completed dishes.

The artificial neural network model may be an artificial neural network model that is pre-trained using image information of completed dishes. The image information of completed dishes may be collected by crawling the web. Also, the image information of completed dishes may comprise information about the recommended time and recommended temperature for optimal cooking, as well as the images of completed dishes.

The artificial neural network model according to an exemplary embodiment of the present disclosure may be re-trained based on a personal database. The personal database may comprise information about the user's response (I.e., user's cooking history) regarding the recommended time and recommended temperature for optimal cooking.

The processor 540 according to an exemplary embodiment of the present disclosure may create reference information 1320, including images of completed dishes, recommended cooking time, recommended temperature, etc., by using a trained artificial neural network model.

The server 16 according to an exemplary embodiment of the present disclosure may continuously receive information about the cooked state of the food being cooked. The information about the cooked state may comprise images of the food ingredients currently being cooked. The information about the cooked state may comprise information about the degree of cooking of the food ingredients detected based on sensing data from the temperature sensor, infrared sensor, etc. The information about the cooked state may further comprise information about the degree of cooking of the food ingredients acquired through spectral analysis. In this way, it is possible to acquire information about the degree of cooking of food by using a variety of well-known technologies, which does not apply only to certain configurations.

FIGS. 15 to 19 are views showing examples of a method for controlling a kitchen appliance according to an exemplary embodiment of the present disclosure.

The example of the present disclosure in FIG. 15 illustrates an oven 500 that receives reference information 1320 from the server 16 and outputs information about the cooked state detected based on the reference information 1320. Although the user started cooking with the oven 500 after setting the cooking temperature to 150 degrees and the cooking time to 15 minutes, the reference information 1320 received from the server 16 showed that the recommended time at the same temperature was 12 minutes. In this case, the food is highly likely to burn or cause fire if cooked for another 3 minutes, and the oven 500 therefore may transmit a message through the speaker 553 or display it on the display 551, which says "The food will burn if cooked for another 5 minutes. You are recommended to finish the cooking after 2 minutes". Also, a message including a detected cooked state may be sent externally to the mobile terminal through a communication module.

The example of the present disclosure in FIG. 16 illustrates an oven 500 that outputs a message recommending to stop the oven 500 immediately upon determining that the time elapsed since the start of the cooking exceeds the recommended cooking time and the food has burnt or is highly likely to burn. In this case, the oven 500 may transmit a message through the speaker 553 or display it on the display 551, which says "The food will burn if cooked further. You are recommended to finish the cooking right now". Also, a message including a detected cooked state may be sent externally to the mobile terminal through a communication module.

The example of the present disclosure in FIG. 17 illustrates an oven 500 that outputs a message recommending to stop the cooking upon determining that the food is cooked properly since the time elapsed since the start of the cooking matches the recommended cooking time. For example, the oven 500 may transmit a message through the speaker 553 or display it on the display 551, which says "The oven will stop operating because the cooking is considered to be completed". Also, a message including a detected cooked state may be sent externally to the mobile terminal through a communication module.

The example of the present disclosure in FIG. 18 illustrates a process in which a signal for controlling the operation of the oven 500 is transmitted to the oven 500 by using a mobile terminal 55 that has received reference information 1320. The display of the mobile terminal 55 may display preset control information and recommended control information together and determine whether the user has the intention to change the control information, based on a touch signal sensed by the touch panel of the display, and the mobile terminal 55 may transmit a control signal to the oven 500 in response to the touch signal input.

The example of the present disclosure in FIG. 19 illustrates a process in which a mobile terminal 55 transmits a signal for controlling the operation of the oven 500 to the oven 500 upon receiving a message recommending to change the control information from the oven 500. In this case, the display of the mobile terminal 55 may display preset control information and recommended control information together, and the mobile terminal 55 may transmit to the oven 500 a control signal for controlling the operation of the oven 500 in response to a touch signal sensed by the touch panel.

The present disclosure described above may be implemented in computer-readable codes in a computer readable recording medium, and the computer readable recording medium may include all kinds of recording devices for storing data that is readable by a computer system. Examples of the computer readable recording medium include HDD (Hard Disk Drive), SSD (Solid State Disk), SDD (Silicon Disk Drive), ROM, RAM, CD-ROM, magnetic tape, floppy disk, optical data storage device, and the like, and may be implemented in the form of carrier waves (e.g., transmission through the internet). Accordingly, the foregoing detailed description should not be interpreted as restrictive in all aspects, and should be considered as illustrative. The scope of the present disclosure should be determined by rational interpretation of the appended claims, and all changes within the equivalent scope of the present disclosure are included in the scope of the present disclosure.

What is claimed is:

1. A method for controlling cooking based on artificial intelligence, the method comprising:
    receiving first food ingredient image information acquired before the cooking through a plurality of cameras located inside a cooking chamber of a kitchen appliance,
    wherein the plurality of cameras comprise:
        a first camera located to acquire a first image of a top surface of food ingredients;
        a second camera located to acquire a second image of a left surface of the food ingredients; and
        a third camera located to acquire a third image of a right surface of the food ingredients;
    combining the first image, the second image and the third image of the first food ingredient image information to produce a fourth image comprising stereoscopic image information about the food ingredients, by combining overlapping portions of the first image, the second image and the third image and uncaptured portions generated by predicting pixel information based on information of the first image, the second image and the third image;
    applying the first food ingredient image information to a pre-trained artificial neural network model;
    applying the stereoscopic image information of the fourth image to the pre-trained artificial neural network model;
    generating reference information including image information of completed dishes as a result of applying the first food ingredient image information to the artificial neural network model and applying the stereoscopic image information of the fourth image to the artificial neural network model;
    receiving second food ingredient image information acquired during the cooking through the plurality of cameras;
    determining a cooked state by comparing the second food ingredient information with the image information of the completed dishes;
    transmitting the reference information or a message including the determined cooked state to the kitchen appliance or a mobile terminal;
    generating a message recommending to change control information depending on the determined cooked state; and transmitting the message recommending to change the control information to the kitchen appliance or the mobile terminal, wherein the message recommending to change the control information comprises information indicating a current cooked state, information indicating a cooking result expected to be yielded if no change is made, and recommended control information.

2. The method of claim 1, wherein the artificial neural network model is an artificial neural network model which is guided and trained on a training data set composed of image information of completed dishes acquired by webcrawling and cooking history information of a user.

3. The method of claim 1, wherein the reference information further comprises recommended control information including recommended times and temperatures for the completed dishes.

4. The method of claim 1, wherein the receiving of the second food ingredient image information comprises receiving the second food ingredient image information at regular time intervals from a start of the cooking until an end of the cooking.

5. The method of claim 1, wherein the second food ingredient image information comprises preset control information of the kitchen appliance and information on a time elapsed since a start of the cooking.

6. The method of claim 1, further comprising:
generating a signal for controlling the kitchen appliance depending on the determined cooked state; and
transmitting the signal for controlling the kitchen appliance to the kitchen appliance.

7. A method for controlling cooking at a kitchen appliance based on artificial intelligence, the method comprising:
acquiring, before the cooking, first food ingredient image information through a plurality of cameras located inside a cooking chamber of the kitchen appliance where food ingredients are placed,
wherein the plurality of cameras comprise:
a first camera located to acquire a first image of a top surface of the food ingredients;
a second camera located to acquire a second image of a left surface of the food ingredients; and
a third camera located to acquire a third image of a right surface of the food ingredients;
transmitting the first food ingredient image information to an external server;
receiving reference information including image information of completed dishes from the external server,
wherein the reference information including the image information of completed dishes is based at least on a fourth image comprising stereoscopic image information about the food ingredients, the fourth image generated by combining overlapping portions of the first image, the second image and the third image and uncaptured portions generated by predicting pixel information based on information of the first image, the second image and the third image;
acquiring, during the cooking, second food ingredient image information through the plurality of cameras;
transmitting the second food ingredient image information to the external server;
determining a cooked state by comparing the second food ingredient image information with the image information of the completed dishes;
transmitting a message including information indicating the determined cooked state to a mobile terminal;
generating a message recommending to change control information depending on the determined cooked state; and
transmitting the message recommending to change the control information to the mobile terminal,
wherein the message recommending to change the control information comprises information indicating a current cooked state, information indicating a cooking result expected to be yielded if no change is made, and recommended control information.

8. The method of claim 7, further comprising controlling the kitchen appliance depending on the determined cooked state.

9. The method of claim 7, wherein the reference information is generated as a result of applying the first food ingredient image information to a pre-trained artificial neural network model stored in the external server.

10. The method of claim 7, wherein the reference information further comprises recommended control information including recommended times and temperatures for the completed dishes.

11. The method of claim 7, wherein the acquiring of the second food ingredient image information comprises acquiring the second food ingredient image information at regular time intervals from a start of the cooking until an end of the cooking.

12. The method of claim 7, wherein the second food ingredient image information comprises preset control information of the kitchen appliance and information on a time elapsed since a start of the cooking.

13. The method of claim 7,
further comprising controlling the kitchen appliance depending on the determined cooked state,
wherein the controlling of the kitchen appliance comprises controlling operation of the kitchen appliance based on a response message received in response to the message recommending to change the control information.

14. An artificial intelligence device comprising:
an antenna configured to receive, from a network, first food ingredient image information which is acquired before cooking through a plurality of cameras located inside a cooking chamber of a kitchen appliance,
wherein the plurality of cameras comprise:
a first camera located to acquire a first image of a top surface of food ingredients;
a second camera located to acquire a second image of a left surface of the food ingredients; and
a third camera located to acquire a third image of a right surface of the food ingredients;
a memory; and
a processor,
wherein the processor is configured to:
combine the first image, the second image and the third image of the first food ingredient image information to produce a fourth image comprising stereoscopic image information about the food ingredients, by combining overlapping portions of the first image, the second image and the third image and uncaptured portions generated by predicting pixel information based on information of the first image, the second image and the third image; and
generate reference information including image information of completed dishes by applying the first food ingredient image information to a pre-trained artificial neural network model and applying the stereoscopic image information of the fourth image to the pretrained artificial neural network model, wherein the antenna is further configured to receive, from the network, second food ingredient information which is acquired through the plurality of cameras, wherein the processor is further configured to determine a cooked state by comparing the second food ingredient image information with the image information of the completed dishes, wherein the processor is further configured to:

transmit the reference information or a message including the determined cooked state to the kitchen appliance or a mobile terminal;

generate a message recommending to change control information depending on the determined cooked state; and transmit the message recommending to change the control information to the kitchen appliance or the mobile terminal, and wherein the message recommending to change the control information comprises information indicating a current cooked state, information indicating a cooking result expected to be yielded if no change is made, and recommended control information.

15. The artificial intelligence device of claim 14, wherein the artificial neural network model is an artificial neural network model that is guided and trained on a training data set composed of image information of completed dishes acquired by crawling the web and cooking history information of a user.

* * * * *